United States Patent [19]
Boehm et al.

[11] 3,954,283
[45] May 4, 1976

[54] TANDEM TRICYCLE

[76] Inventors: Vera L. Boehm; Frederick A. Boehm, both of 322 Twin Oaks Way, Healdsburg, Calif. 95448

[22] Filed: Feb. 10, 1975

[21] Appl. No.: 548,266

[52] U.S. Cl. .................................. 280/273; 280/282
[51] Int. Cl.² ............................................. B62K 5/04
[58] Field of Search .......... 280/202, 273, 231, 270, 280/278, 282, 7.16, 7.1, 1

[56] References Cited
UNITED STATES PATENTS

| | | | |
|---|---|---|---|
| 1,250,665 | 12/1917 | Rossi | 280/273 X |
| 1,295,804 | 2/1919 | Sefranek | 280/202 |
| 2,320,344 | 6/1943 | Belanger | 280/202 |
| 2,644,345 | 7/1953 | Sebel | 280/259 X |
| 2,948,551 | 8/1960 | DuVall | 280/202 |
| 3,717,360 | 2/1973 | Kennedy | 280/282 |

*Primary Examiner*—Kenneth H. Betts
*Attorney, Agent, or Firm*—Gregg, Hendricson, Caplan & Becker

[57] ABSTRACT

A three-wheeled vehicle or tricycle having an elongated frame mounting an auxiliary tricycle seat behind an operator's seat with handle bars and pedals for the auxiliary seat which are not connected to tricycle wheels for providing an auxiliary simulated tricycle arrangement upon a tricycle for small children.

5 Claims, 6 Drawing Figures

TANDEM TRICYCLE

BACKGROUND OF INVENTION

There have been developed and marketed a wide variety of peddle-operated wheeled vehicles generally having anywhere from one to four wheels and requiring varying degrees of physical dexterity to operate. Two-wheeled vehicles or bicycles are commonly employed by children and adults alike and tricycles or three-wheeled vehicles are commonly employed by children before they attain the physical capabilities for riding bicycles. Although tricycles are made in a variety of different sizes for children of different ages to ride without the necessity of being able to balance themselves, there remains the problem of the very small child that is physically large enough to be seated on a tricycle but is yet unable to operate it and/or cannot yet be trusted to steer it. Children of this age and size understandably wish to be transported about on a tricycle or the like of older children and at the same time to have the feeling of engaging in the operation thereof.

SUMMARY OF INVENTION

The present invention comprises a two-seated tricycle particularly adapted to carry a very young rider on the rear seat which is provided with handle bars and pedals, so that the occupant thereof experiences the feeling of steering and propelling a tricycle, even though his efforts cannot disrupt the proper operation of the vehicle. Upon a tricycle of relatively conventional design and elongated frame, there is mounted a rear tricycle seat with a second handle bar in front of the seat for gripping by the young rider of the rear seat. There is also provided a pair of tricycle pedals in position to be engaged by the young rider of the rear seat, so that the later is provided with the equivalent of all of the operating and control mechanisms of the tricycle operator. In the present invention, the mechanisms associated with the second or rear seat are not operable to influence the tricycle propulsion or steering, however, the rear handle bars may be movable to simulate steering of the vehicle and also the pedals may be movable by the rider of the rear seat so that a young occupant thereof is not only transported upon the vehicle, but is also seated like and provided with the same surroundings as the tricycle operator.

DESCRIPTION OF FIGURES

The present invention is illustrated as to a particular preferred embodiment thereof in the accompanying drawings wherein.

DESCRIPTION OF PREFERRED EMBODIMENT

Figure 1:
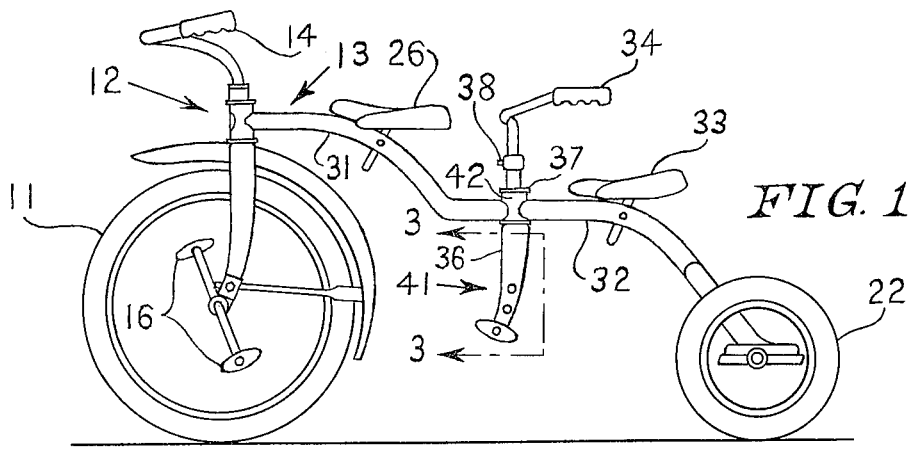
FIG. 1 is a side elevational view of the tricycle in accordance with the present invention.
Figure 2:
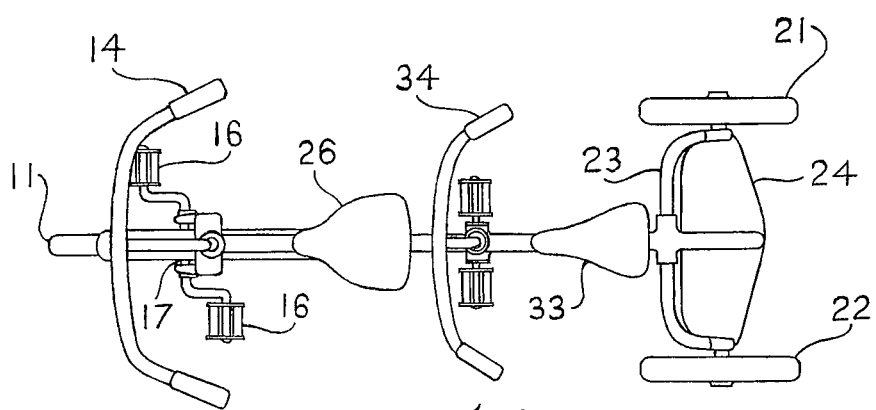
FIG. 2 is a plane view of the tricycle of FIG. 1.
Figure 3:
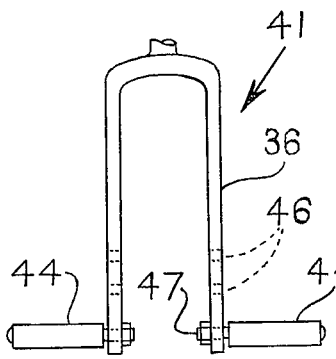
FIG. 3 is a partial elevational view of the auxiliary or rear pedal arrangement taken in the plane 3—3 of FIG. 1.
Figure 4:
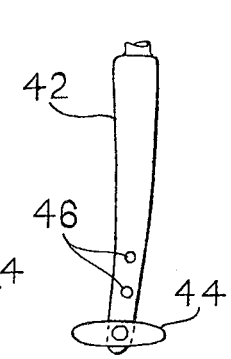
FIG. 4 is a side elevational view of the pedal mounting of FIG. 3.

The present invention incorporates the elements of a conventional tricycle, and in FIGS. 1 and 2 these will be seen to include a front wheel 11 mounted on a conventional fork assembly 12 journalled in a mounting sleeve at the front of frame 13 with handle bars 14 engaging the fork at the top thereof to turn the same in order to steer the tricycle. Conventional pedals 16 are mounted on a crank shaft 17 engaging the front wheel 11 so that the vehicle may be driven by pedalling. There is also included a pair of rear wheels 21 and 22 rotatably mounted upon a generally U shaped frame member 23, and a platform 24 may be also mounted on this member between the rear wheels. A tricycle seat 26 is mounted on the frame behind the front wheel, so that an operator may sit upon this seat and propel the vehicle by operating the pedals 16 and steer the vehicle by the handle bars 14. Various auxiliary equipment such as fenders and the like may be provided although same are of course required.

The three-wheeled vehicle described above is quite steady and stable so that relatively young children can ride such a vehicle without the necessity of balancing themselves, as is required upon a two-wheeled vehicle. There is however some limit upon how small the child may be and yet satisfactorily operate a tricycle. The inability of the very small child to operate a tricycle does not however, reduce the desire of such a child to operate or ride a tricycle. A very small boy, for example, upon seeing his older brother ride a tricycle, naturally wishes to do so himself, and merely giving such a small boy a ride on a tricycle or bicycle, does not satisfy his craving to operate the vehicle. The present invention provides an improvement in tricycles, wherein those children that are too young to actually operate a tricycle may yet ride upon the tricycle and simulate operation thereof, without in any way interferring with proper operation of the vehicle by the older child. To this end, the present invention provides an elongated frame 13, which may for example comprise a first curved portion 31 extending rearwardly and downwardly from the top of the fork 12 and a second frame portion 32, extending rearwardly and downwardly from the first frame portion 31. The conventional tricycle seat 26 is mounted upon the first frame portion 31 and a second like tricycle seat 33 is mounted on the second frame portion 32. This second seat 33 may be somewhat smaller than the conventional tricycle seat 26, in order to accommodate a very small child seated thereon. This is also provided by the present invention a second set of handle bars 34, mounted upon and extending upwardly from the rear frame portion 32 ahead of the seat 33 thereon. This rear or auxiliary set of handle bars 34 is preferably mounted for vertical adjustment and may be limitedly pivotable as by engagement with the top of a fork assembly 36 journalled in a mounting sleeve 37 secured to the frame portion 32. A tightening bolt 38 may be provided so that the handle bars may be vertically adjusted to accommodate "auxiliary operators" in the form of different sized small children that may be seated upon the auxiliary or rear seat 33. The sleeve 37 may be welded between the frame portions 31 and 32.

There is furthermore provided by the present invention, pedal means 41 for the auxiliary or rear seat 33. These pedal means 41 may for example, include the fork 36, having an upwardly extending stub shaft journalled in the mounting sleeve 37. The pedal means 41 further include pedals 44, mounted one on each side of the fork 36, and extending laterally outward therefrom, as by means of pedal shafts extending through fork apertures 46 with a tightening nut 47 on the pedal shafts. In order to accommodate the pedal means to different sized riders on the auxiliary seat 33, there is preferably provided a number of fork apertures 46 at different heights, so that the pedals may be appropriately set for engagement by the feet of different sized young riders upon the vehicle.

Figure 5:
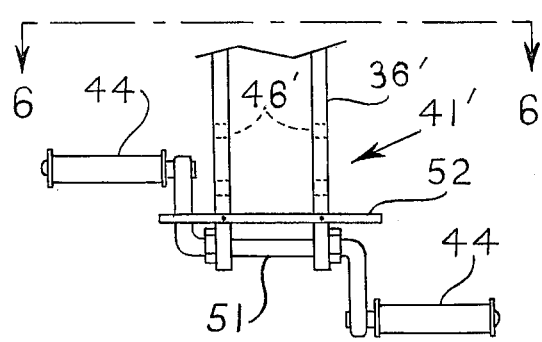
FIG. 5 is a front elevational view of an alternative rear pedal mounting.
Figure 6:
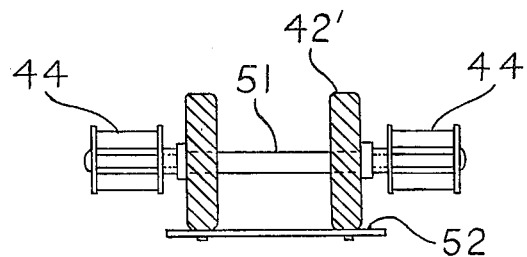
FIG. 6 is a horizontal sectional view taken in the plane 6—6 of FIG. 5.

The present invention may also provide for movement of the pedals 44, although it will be appreciated that these pedals are not operable to propel the vehicle. In FIGS. 5 and 6, there is illustrated an alternative auxiliary pedal means 41', wherein a fork 36' is provided with a number of aligned apertures 46' in opposite sides thereof, with a crank shaft 51 being adjustably mounted therethrough. The pedals 44 are secured to the ends of the shaft 51, so that the pedals may actually be pedalled rather than merely serving as a foot rest. By this means, a young rider upon the auxiliary seat 33, may actually pedal the vehicle, or at least simulate such pedalling for the pedals 41 or 41' are not connected to any drive mechanism of the vehicle. There may be additionally provided means connected with the auxiliary pedal means 41' for generating a noise by pedalling by a young rider on the auxiliary seat 33, and such may for example include a flexible bar 52 secured to the fork 36' and extending laterally outward therefrom to be engaged by the crank shaft 51 as it is rotated during pedalling. With this element 52 being resiliently flexible, operation of the pedal mechanism 41' will consequently produce a clacking or snapping noise as the pedals are operated. It has been found that this simple expedient is particularly pleasing to a young child seated upon the auxiliary seat 33 and obstensibly operating the tricycle of the present invention. With the handle bars 34 and fork 36 or 36' connected together turning of the handle bars will pivot the fork so that the rider on the auxiliary seat 33 experiences the same movements as the real operator. Preferably the handle bars are only limitedly pivotable as by providing stops engaging projections on the handle bar shaft or fork shaft.

The present invention will be seen to provide for a very realistic simulation of tricycle operation by a child that is too small to actually operate a tricycle. With an older child operating the tricycle, the movement thereof is achieved, and yet the young rider of the auxiliary seat 33 is able to presumably pedal the tricycle and steer the tricycle, so that this young rider then experiences much more than a ride for it appears to him that he is operating a tricycle both as to propulsion and steering. In addition to this simulated operation, the provision of the auxiliary handle bars and pedals serves as a safety feature wherein the very young rider engages the vehicle with both hands and feet so as to be less likely to fall from the auxiliary seat. Generally the enthusiasm of the very young rider on the auxiliary seat is such as to cause him to firmly grip the handle bars so he is almost precluded from falling from the tricycle.

Although the present invention has been described above with respect to particular preferred embodiments thereof, it is not intended to limit the invention to the exact terms of description or details of illustration, for it will be apparent to those skilled in the art that modifications and variations are possible within the spirit and scope of the invention.

What is claimed is:

1. A tricycle comprising an elongated frame having a front steering wheel and a pair of laterally offset rear wheels mounted thereon with a front seat behind the front wheel, a rear seat mounted on said frame behind said front seat and ahead of said rear wheels, auxiliary handle bars pivotally mounted on said frame in extension upwardly therefrom between said seats and auxiliary pedals mounted on said frame below said auxiliary handle bars whereby a rider seated in said rear seat may grip said auxiliary handle bars and turn the handle bars to simulate steering and place his feet on said auxiliary pedals.

2. The tricycle of claim 1 further defined a fork mounting said auxiliary pedals beneath said frame and vertically adjustable mounting means engaging said pedals with said fork.

3. The tricycle of claim 1 further defined by said auxiliary pedals being mounted upon a crankshaft rotatably carried by a fork depending from said frame beneath said auxiliary handle bars whereby said pedals may be rotated by a rider in said auxiliary seat to simulate pedaling of the tricycle.

4. The tricycle of claim 3 further defined by means secured to said frame and pivotally mounting said fork and auxiliary handle bars together whereby turning of said auxiliary handle bars also turns said fork and said auxiliary pedals.

5. A tandem tricycle comprising
an elongated tricycle frame,
a front fork rotatably mounted in depending relation to the front of said frame and having handle bars atop same above said frame,
a front wheel mounted on a crankshaft extending through said fork with pedals on said shaft for pedal propulsion of said tricycle,
a front seat mounted on said frame behind said handle bars,
a pair of rear wheels axle-mounted at the rear of said frame,
an auxiliary seat mounted upon said frame behind said front seat ahead of said rear wheels,
auxiliary handle bars mounted on said frame in extension upwardly therefrom between said seats for gripping by a rider in said rear seat,
a fork pivotally mounted through said frame between said seats and carrying said auxiliary handle bars atop the fork,
a crankshaft rotatably carried by said fork below said frame, and
auxiliary pedal means including a pair of pedals on the outer offset ends of said crankshaft for receiving the feet of a rider on said rear seat.

* * * * *